(12) United States Patent
Crane (10) Patent No.: US 8,458,059 B2
(45) Date of Patent: Jun. 4, 2013

(54) APPARATUS AND METHOD FOR ASSESSING MARKET CONDITIONS

(75) Inventor: George C Crane, Manchester, NH (US)

(73) Assignee: CAPGUARD.COM, Inc., Las Vegas, NV (US)

( * ) Notice: Subject to any disclaimer, the term of this patent is extended or adjusted under 35 U.S.C. 154(b) by 2793 days.

(21) Appl. No.: 09/736,070

(22) Filed: Dec. 13, 2000

(65) Prior Publication Data

US 2002/0073004 A1    Jun. 13, 2002

(51) Int. Cl.
G06Q 40/00    (2012.01)

(52) U.S. Cl.
USPC .......................................................... 705/35

(58) Field of Classification Search
USPC ............ 76/21, 50, 35, 4, 26–27, 15; 705/354, 705/36, 37, 35
See application file for complete search history.

(56) References Cited

U.S. PATENT DOCUMENTS

| | | |
|---|---|---|
| 5,161,103 A | 11/1992 | Kosaka et al. |
| 5,237,496 A | 8/1993 | Kagami et al. |
| 5,299,115 A | 3/1994 | Fields et al. |
| 5,402,520 A | 3/1995 | Schnitta |
| 5,444,819 A | 8/1995 | Negishi |
| 5,521,813 A | 5/1996 | Fox et al. |
| 5,563,983 A | 10/1996 | Nozaki et al. |
| 5,577,166 A | 11/1996 | Mizuno |
| 5,615,341 A | 3/1997 | Agrawal et al. |
| 5,712,985 A | 1/1998 | Lee et al. |
| 5,742,071 A | 4/1998 | Kamohara et al. |
| 5,761,386 A | 6/1998 | Lawrence et al. |
| 5,761,441 A | 6/1998 | Bennett |
| 5,761,442 A | 6/1998 | Barr et al. |
| 5,769,793 A | 6/1998 | Pincus et al. |
| 5,893,079 A | 4/1999 | Cwenar |
| 5,946,666 A | 8/1999 | Nevo et al. |
| 5,974,403 A | 10/1999 | Takriti et al. |
| 5,978,778 A | 11/1999 | O'Shaughnessy |
| 6,003,018 A | 12/1999 | Michaud et al. |
| 6,012,042 A | 1/2000 | Black et al. |
| 6,035,286 A | 3/2000 | Fried |
| 6,058,369 A | 5/2000 | Rothstein |
| 6,058,370 A | 5/2000 | Church et al. |
| 6,061,662 A | 5/2000 | Makivic |
| 6,078,904 A | 6/2000 | Rebane |
| 6,088,676 A | 7/2000 | White, Jr. |
| 6,125,355 A | 9/2000 | Bekaert et al. |

(Continued)

OTHER PUBLICATIONS

Morters, Perter & Peres Yuval. Brownian Motion. University of California Berkley. May 25, 2008.*

(Continued)

Primary Examiner — Muriel Tinkler
(74) Attorney, Agent, or Firm — Ropes & Gray LLP; Jeffrey H. Ingerman (57) ABSTRACT

An apparatus and method for assessing market conditions, or for analyzing of other parameters that appear to fluctuate randomly, compare the changing conditions to the changes that would be predicted by Brownian Motion. When the changes exceed those predicted by Brownian Motion, a trend is considered to exist and can be expected to continue, and when the changes are less than those predicted by Brownian Motion, then a congestion condition exists. When enough measurements are taken, the length of the trend or congestion can be predicted. In one embodiment, the computation necessary to analyze the data on the condition being monitored is distributed among computers of subscribers to a monitoring service based on the method.

26 Claims, 6 Drawing Sheets

U.S. PATENT DOCUMENTS

| | | | |
|---|---|---|---|
| 6,175,824 B1 | 1/2001 | Breitzman et al. | |
| 6,272,474 B1 | 8/2001 | Garcia | |
| 6,456,982 B1* | 9/2002 | Pilipovic | 705/36 R |
| 7,236,952 B1* | 6/2007 | D'Zmura | 705/36 R |
| 2002/0073004 A1* | 6/2002 | Crane | 705/35 |

OTHER PUBLICATIONS

Kalyanam, et al. Estimating irregular pricing effects: A stochastic spline regression approach. JMR, Journal of Marketing Research; Feb. 1998; 35, 1; ProQuest Central. p. 16.*

Osborne, MFM. The Dynamics of Stock Trading. Econometrica (pre-1986); Jan. 1965; 32, 1; ProQuest Central. p. 88.*

Bachelier, L., "Theory of Speculation" (1900), translated in Cootner, P.H., ed., *The Random Character of Stock Market Prices*, pp. 17-78 (see, esp., n.7, p. 77) (Boness, A.J., translator) (M.I.T. Press, 1964).

Cavanagh, L.D., "Real-World Option Pricing," *Technical Analysis of Stocks & Commodities*, pp. 94-97 (May 1966).

Goodstein, D.L., et al., *Feynman's Lost Lecture: The Motion of Planets Around the Sun*, pp. 145-170, 179-182 (Cal. Inst. of Tech., 1996).

James, C., "Problems With Black Scholes: An Intuitive Look," *The GFA Analyst*, Graduate Finance Association, University of Texas at Austin (Mar. 1996).

Parabon Computation, Inc., The Frontier™ Application Programming Interface, Version 0.5.0 (Oct. 10, 2000).

Stachel, J., ed., *Einstein's Miraculous Year: Five Papers That Changed the Face of Physics*, pp. 77, 85-98 (Princeton University Press, 1998), reproducing Einstein, A., "On the Motion of Small Particles Suspended in Liquids at Rest Required by the Molecular-Kinetic Theory of Heat" (1905).

Stewart, I., "Putting randomnesss in order," *New Scientist* (May 10, 1997).

Stix, G., "A Calculus of Risk," *Scientific American* (May 1998).

Woolard, E.W., "Celestial Mechanics," *Fundamental Formulas of Physics*, Menzel, D.H., ed., vol. 2, pp. 680-696 (1960).

Bacon, C., *Practical portfolio performance measurement and attribution*, p. 80 (2004).

Bass, T., *The Predictors: How a Band of Maverick Physicists Used Chaos Theory to Trade Their Way to a Fortune on Wall Street*, pp. 205-208 (1999).

Bauer, R.J., Jr., *Genetic Algorithms and Investment Strategies*, pp. 42-45 (1994).

Casti, J.L., *COMPLEXification: Explaining a Paradoxical World Through the Science of Surprise*, pp. 252-259 (1995).

Chorafas, D.N., *Managing Derivatives Risk: Establishing Internal Systems and Controls*, pp. 341-344 (1995).

Cunningham, L.A., *How to Think Like Beniamin Graham and Invest Like Warren Buffett*, pp. 33-49 (2001).

Deboeck, G.J., ed., *Trading on the Edge: Neural, Genetic and Fuzzy Systems for Chaotic Financial Markets*, pp. 274-279, 353-361 (1994).

Eglash, R., *African Fractals: Modern Computing and Indigenous Design*, pp. 12-13, 208-209 (1999).

Gale Reference Team, "Biography—Mandelbrot, Benoit B. (1924- )," *Contemporary Authors* (Thomson Gale, 2004).

Gleick, J., *CHAOS: Making a New Science*, pp. 308-309 (1987).

Hurst, H.E., *The Nile: a general account of the river and the utilization of its waters*, pp. 281-300 (1952; revised ed. 1957).

Lavinio, S., *The Hedge Fund Handbook: A Definitive Guide for Analyzing and Evaluating Alternative Investments*, pp. 179-181 (2000).

Mandelbrot, B., "Do you See Pattern Here?," *Wired*, pp. 89-90 (Aug. 2004).

Mandelbrot, B.B., "A Multifractal Walk Down Wall Street," *Scientific American*, vol. 280, No. 2, pp. 70-73 (Feb. 1999).

Mandelbrot, B.B., et al. *The (Mis) Behavior of Markets: A Fractal View of Risk, Ruin and Reward*, pp. 173-195 (2004).

May, C.T., *Nonlinear Pricing: Theory & Applications*, pp. 119-121, 149-172 (1999).

Murphy, J.E., Jr., *Stock Market Probability*, pp. 105-109 (1994).

Nelson, Edward, *Dynamical Theories of Brownian Motion* (Princeton University Press, 1967, second edition, Aug. 2001, Posted on the World Wide Web at http://www.math.princeton.edu/~nelson/books.html.

Panini, R., "From Nile to NYSE," *Technical Analysis of Stocks and Commodities*, vol. 25, No. 2, pp. 44-48 (Feb. 2007).

Panini, R., "Trading Systems and Fractals," *Technical Analysis of Stocks and Commodities*, vol. 25, No. 3, pp. 36-38, 40, 42 (Mar. 2007).

Peitgen, H.-O., "The Causality Principle, Deterministic Laws and Chaos," in Holte, J., ed. *CHAOS: The New Science*, pp. 35-43 (1993).

Peters, E.E., *Chaos and Order in the Capital Markets: A New View of Cycles, Prices and Market Volatility*, pp. v, 27-38, 107-121 (1999).

Tvede, L., *Business Cycles: From John Law to the Internet Crash*, pp. 179-203 (2001).

Tvede, L., *The Psychology of Finance*, pp. 254-255 (1999).

Ward, L.M., *Dynamical Cognitive Science*, pp. 130-131 (2002).

Williams, L.V., ed., *Information Efficiency in Financial and Betting Markets*, pp. 18-21 (2005).

\* cited by examiner

APPARATUS AND METHOD FOR ASSESSING MARKET CONDITIONS

BACKGROUND OF THE INVENTION

This invention relates to a technique for assessing the condition of a varying system such as a broadly-traded market, which may be a public financial market. More particularly, this invention is a technique for determining the state of a market price relative to a normative value, and whether such price is likely to change or to remain about the same.

It has been theorized that, absent undue influences, such as collusion within a market, price movements within that market should follow a normal distribution typical of purely random events. That is, it has been expected that if the frequency at which any given normalized or percentage price change occurs is plotted in a histogram as a function of price change, the result would be a Gaussian curve—i.e., the familiar bell curve represented by the formula:

$$f(x) = (2\pi\sigma)^{-0.5} \exp(-((x-\mu)^2/2\sigma^2)), -\infty < x < \infty$$

The interpretation of such a curve in the context of, for example, the United States equity markets, as typified by the New York Stock Exchange, or other securities or contract markets, is that most often, price changes are zero—i.e., prices tend to remain where they are, small and moderate increases or decreases are the next most frequent occurrences, and very large increases or decreases are vanishingly rare.

Models used to predict stock market activity have tended to be based on the assumption that price change activity follows a normal distribution.

However, empirical observations show that the actual curve is a distorted bell curve. Specifically, the peak is taller than expected, meaning prices stay about the same even more often than would be expected from purely random changes, and narrower than expected, meaning that the frequency of moderate increases or decreases is less than expected, and the "tails" of the curve—in the ranges that would be expected to be statistically insignificant—have unexpected bulges, meaning that extreme increases and decreases happen more frequently than expected.

These variations of market behavior from expected norms lead to the failure of the known models for market assessment and prediction.

It would be desirable to be able to develop a model of market price change activity that explains the non-normal price change distribution of such activity, and to provide a technique for market assessment and prediction based on such a model.

SUMMARY OF THE INVENTION

It is an object of the present invention to develop a model of market price change activity that explains the non-normal distribution of such activity, and to provide a technique for market assessment and prediction based on that model.

The invention is based on the proposition that if there are no undue outside influences on a financial market, and there is no collusion within the market, prices can be expected to be haphazardly pushed about so as to oscillate around a mean in a manner predicted by Brownian motion. A particle subject to Brownian motion is pushed around by the random motions of neighboring particles, and takes time Δt to move throughout a circular two-dimensional area of radius r, and can be expected to take 4Δt to cover the circular area of radius 2r (including the original area of radius r) because that area is four times the original area (an r-squared relationship). The same is true of, e.g., stock prices—if prices move within a range Δp during a time interval Δt, then during the ensuing 3Δt (for a total elapsed time of 4Δt), prices should move erratically or haphazardly within a range of magnitude 2Δp (i.e., it takes four times as long to move twice Δp as it takes to move once Δp). If in fact the range of price movement during the longer interval is smaller than twice what it was during the shorter interval, then there is some other influence, such as a congealed group of buyers or sellers, who may be acting independently or colluding, whose collective buying and/or selling acts to push or constrain price in a particular direction, and the price movement is in a congestion situation. On the other hand, if the range of price movement during the longer interval is larger than twice what it was during the shorter interval, then there is some other influence such as the aforementioned congealed group of buyers or sellers, and the price movement is in a trend situation. In a trend situation, the absolute magnitude of the price will reveal whether the trend is an upward trend or a downward trend. Note that it is not necessary to use a longer period that is four times the shorter period; rather, any longer period can be used, and the range of expected movement is proportional to the square root of the ratio of the durations of the longer and shorter periods. For example, if the longer period is nine times the shorter period, the expected range of movement in the longer period would be three times the range of movement in the shorter period.

This relationship should hold regardless of the absolute magnitude of the time periods involved. Thus, using the four-to-one ratio, the movement over the last four minutes should be twice the movement that occurred in the one-minute interval between four minutes ago and three minutes ago, just as the movement over the last four hours should be twice the movement that occurred in the one-hour interval between four hours ago and three hours ago and the movement over the last four days should be twice the movement that occurred in the one-day interval between four days ago and three days ago. By continually monitoring price changes, one can continually compute, based on any time interval or intervals one chooses, whether the market is in a trend situation or a congestion situation. One can choose to monitor only the previous four minutes, or only the previous four hours, or both the previous four minutes and the previous four hours, or days, or months, or years, or any other combination.

Instead of, or in addition to, monitoring the range of prices during an interval and treating that interval as the longer interval, going back and taking the first quarter of that interval as the shorter interval, one could determine the range during an interval and treat that interval as the shorter interval. From that range measured during the shorter interval one could predict the expected range during the ensuing longer interval of which the shorter interval is a part. For the remainder of the longer interval one could simply monitor the actual price at each moment during the longer interval, looking forward instead of waiting for the interval to be completed and looking backward to calculate the actual range. If the price moves outside the expected range, then clearly the magnitude of the actual range is going to be larger than that of the expected range, and one can assume that a trend has begun without having to determine what the actual range is. If the actual price is within the expected range, however, it may remain within a smaller range (indicating congestion), so in that case it would be necessary to wait until the longer interval is complete and determine the actual range.

As an alternative to the "square-root-of-time" relationship just described, one could compare price movements against a generated Brownian motion standard. Such standards are increasingly common in personal computers, in which they may be provided in the form of a separate chip the output of which is based, e.g., on fluctuations of chip temperature, and are provided to facilitate encryption algorithms. If such a standard is used, then the time intervals for which price changes are measured can be arbitrary.

Because price ranging is subject to an r-squared relationship (as discussed above), price ranging can be compared to a planetary orbit, which is also governed by an r-squared relationship (i.e., gravity), with the core force exerted by the star around which the planet orbits. When a planet is orbiting about a star with no influence other than the inverse-square force of the star, the planetary orbit will be circular. However, for known planets there is always another influence, which is the net gravitational force exerted by the rest of the universe. Where there is such a second influence, the planetary orbit becomes distorted into a familiar elliptical shape, with the planet moving fastest when it is near its star, slowest when it is furthest from its star, and at its prior medium or undistorted speed somewhere in between.

Following this analogy, price ranging can be considered as following an elliptical orbit, with the core influence stemming from the Brownian motion force exerted by the bulk of buying and selling—i.e., the "star" around which price ranging (the "planet") orbits. The disturbing force is the congealed group of buyers or sellers trying to move the price concertedly in one direction (either up or down). This orbital analogy teaches us first that every trend must be followed by a congestion period—and vice-versa—because the orbit is closed, unless the outside influence is so great that the orbital ellipse opens up to a parabola or hyperbola, in which prices fly off one end, "crash," and do not automatically return (e.g., in October 1929). Moreover, by fitting price change data to an ellipse, one can determine the shape of the ellipse and where on the ellipse price ranging currently is. Using Kepler's Laws of planetary motion, which postulate that an orbiting planet will sweep out equal areas in equal times, and knowing how long the market price ranging took to move between the plotted points, one can determine when the market price ranging will move from its current condition to a different condition—i.e., if market price ranging is in a trend, when it will move into a congestion period, and if market price ranging is in a congestion period when it will break out into a trend.

Although the invention has been described thus far with regard to market price data, it can be applied to other financial data, or to non-financial data such as biological or meteorological data.

Because time continues to move forward, while one is performing the calculations for a selected interval, the four-time-unit window is moving. Depending on the granularity chosen, one must soon begin the next calculation. For example, if one is calculating based on a four-hour window, one may want to sample that four-hour window every ten minutes, or every minute, or perhaps only once an hour. If the sampling is too infrequent, one may miss the turning point between a trend and congestion, or vice-versa. But if the sample is too frequent, it may simply add to the computational burden with little gain of useful data. Thus, sampling the previous four hours every second may be too frequent, but sampling the previous four hours only every two hours may not be frequent enough. Sampling every minute would appear to be a practical approach.

In any event, all of this continual recalculation of the four-time-unit data requires significant computing resources. In accordance with another aspect of the invention, those computing resources are provided by all of those using the method of the invention. As part of a subscription to the data feed produced by the method, a subscriber preferably would agree to accept a distributed portion of the data to be analyzed and to have his or her computer perform the analysis. One way that this could be done would be to have the analysis performed only while the subsriber's computer is idle, such as by a program that operates when the computer is in "screen saver" mode. In one embodiment of such distributed computing system, a subscriber would have the option of whether or not to make his or her computer available, with those subscribers who make their computers available receiving a discounted subscription rate as compared to those subscribers who do not make their computers available.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which.

DETAILED DESCRIPTION OF THE INVENTION

As described above, the present invention allows one to monitor changing data over time intervals, and to determine, from the change of the data during the interval, the present state of the data relative to normative value, and how the data are likely to change in the future or, more specifically, whether or not current patterns in the data can be expected to continue. The types of data for which the invention will operate are those types where a datum is pushed about in various directions by forces governed by a relationship based on the inverse power of the number of degrees of freedom, much like the motion of a small particle suspended in a thin layer liquid, being pushed about by invisible collisions with molecules of the liquid which, as a two-dimensional system, is governed by an inverse-square law (a three-dimensional system would be governed by an inverse-cube law). Thus, a stock price, whose measurements over time represent a two-dimensional system, does not change purely randomly, as has been believed, but moves based on "collisions" with orders from buyers and sellers who are buying and selling predominantly haphazardly.

The invention will now be explained with reference to FIGS. 1-9.

Figure 1:
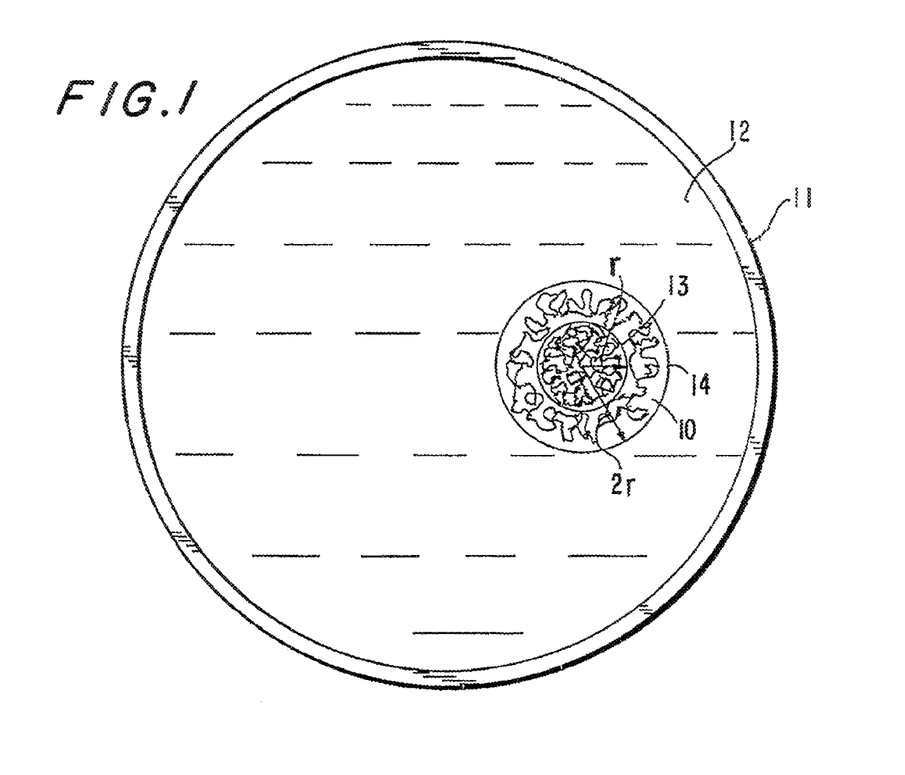
FIG. 1 is an example of Brownian motion of a particle in a shallow dish of liquid.

FIG. 1 shows the movement of a particle 10 in a Petri dish 11 filled with a thin layer of liquid 12. In a first time interval $\Delta t$, the particle moves throughout the area of the circle 13 of radius r. The area of the circle 14 of radius 2r is four times the area of circle 13. Therefore, the time necessary for the particle 10 to move throughout the area of circle 14 is four times Δt, or 4Δt. This longer time interval includes the initial time interval Δt (insofar as circle 13 is wholly within circle 14), and thus concludes 3Δt after the end of the initial time interval Δt.

Figure 2:
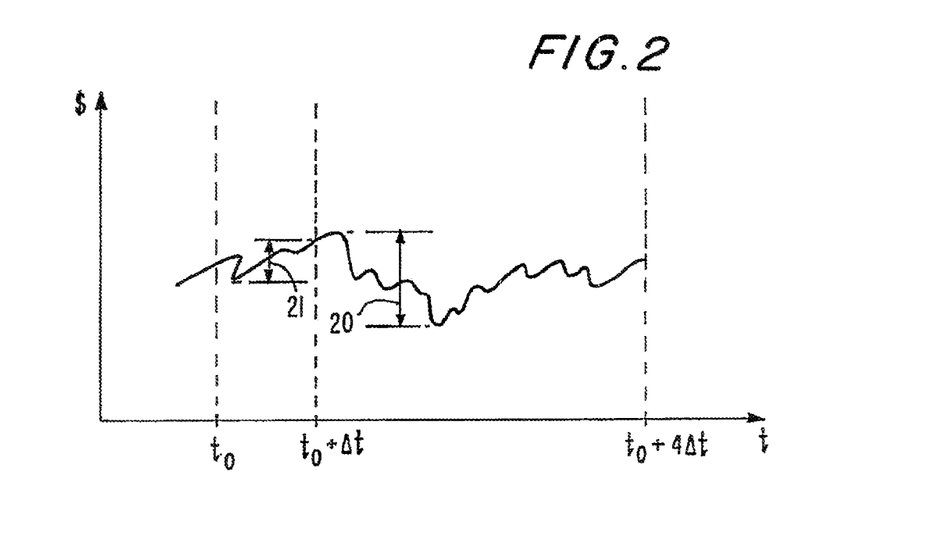
FIG. 2 is a graph comparing the ranging of stock prices to Brownian motion.

FIG. 2 is a graph of stock price changes over time. Instead of circles of radii r and 2r, what is important is the range of price changes, between a minimum price during an interval and the maximum price during that interval. For a first interval of duration Δt beginning at time $t_0$ and a second interval of duration 4Δt beginning at time $t_0$, one would expect the range 20 between minimum and maximum prices during the longer interval to be twice the range 21 between minimum and maximum prices during the shorter interval, if the changes produced by buying and selling occurred in a purely Brownian motion fashion.

Figure 3:
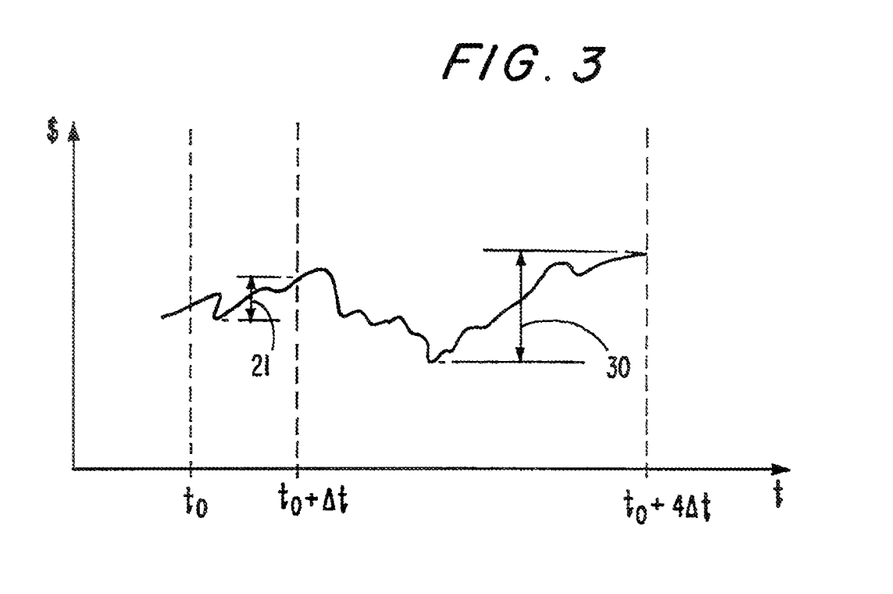
FIG. 3 is a graph showing greater ranging of stock prices than would be predicted by Brownian motion.

FIG. 3 is similar to FIG. 2, but range 30 is more than twice range 21. This is a situation where an outside force is tugging against the movement of price and distorting it from expanding at a uniform rate as depicted by the Brownian motion circle, and represents a price trend. In this particular case, the trend is upward, which can be seen from the magnitudes of the changes.

Figure 4:
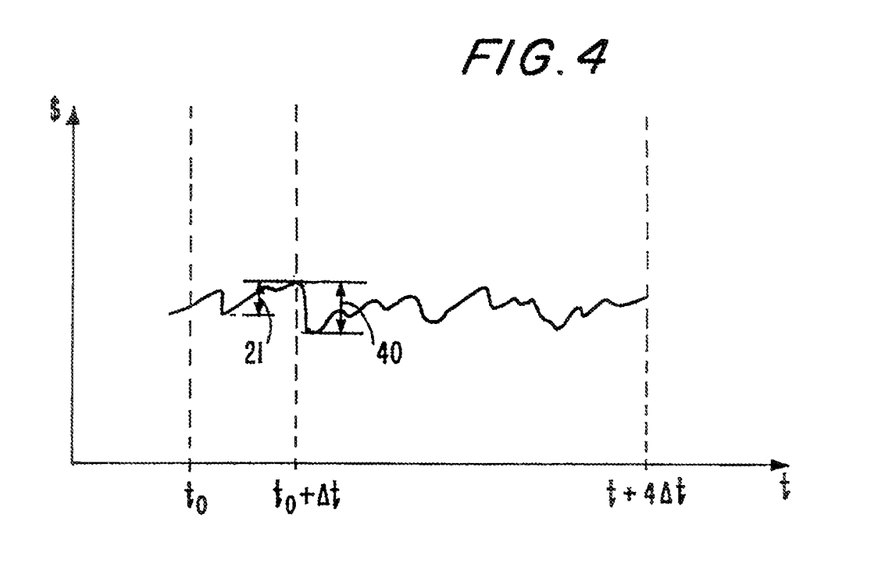
FIG. 4 is a graph showing less ranging of stock prices than would be predicted by Brownian motion.

FIG. 4 is similar to FIGS. 2 and 3, but range 40 is less than twice range 21. This is a situation where an outside force is constraining the movement of price and distorting it from expanding at a uniform rate as depicted by the Brownian motion circle, and represents a price congestion condition.

Note that while the time intervals in FIGS. 2-4 are shown as being related by a multiple of 4, with an expected price range multiple of 2, the multiple of the time intervals can have any value, with the expected price range multiple being the square root of the multiple of the time intervals. Moreover, if the price changes are being compared to a generated Brownian motion standard, then any time interval can be used.

The graphs of FIGS. 2-4 can be represented as orbital models as discussed above. The condition of FIG. 2, in which the range of prices during the longer time interval is exactly twice the range during the shorter interval normally can be expected to exist for only very short times, as conditions move between the other states shown in FIGS. 3 and 4. However, if the condition of FIG. 2 were to persist, it would signify that price changes were purely Brownian, with no congealed group of buyers or sellers acting to distort the inverse-square law effect. The abstract orbital representation of such a price-expansion condition would be a circle of arbitary radius (not shown), representing an orbit around a single source of inverse-square law force, with no disturbing force.

Figure 5:
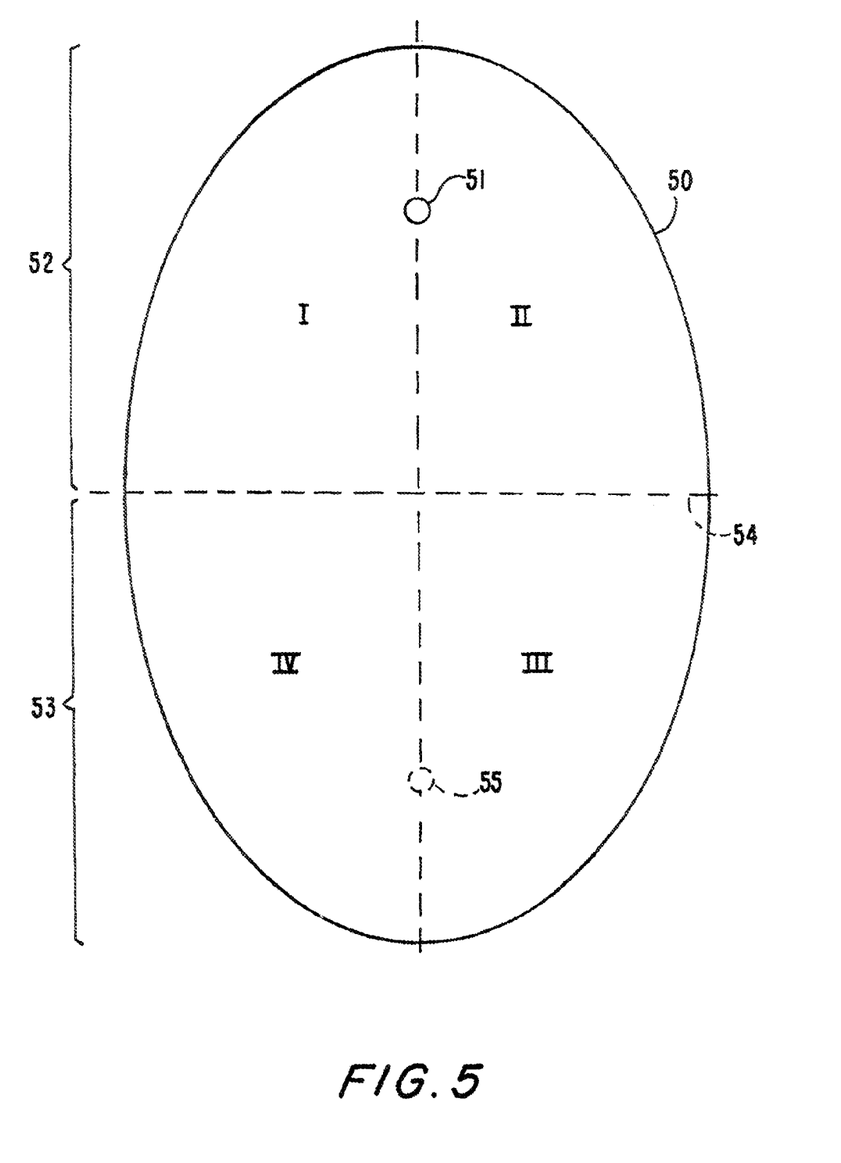
FIG. 5 is a plot comparing the ranging of stock prices to a planetary orbit.

The more common price-expansion situations, illustrated in FIGS. 3 and 4, can be analogized to non-circular elliptical planetary orbits as discussed above, with the core inverse-square law Brownian motion "force" located at one focus of the ellipse in the role of the star, and the net effect of the distorting "force" resulting from the congealed group of buyers or sellers located at the second focus of the ellipse. The values calculated according to the present invention represent velocity along the elliptical orbit. Such a non-circular elliptical orbit 50 is shown in FIG. 5, with the Brownian "star" 51 at one focus, and the net effect of the distorting forces acting at a second focus 55. Just as in planetary mechanics, the orbiting body will sweep equal areas between itself and the "star" in equal times. Therefore, when the orbiting body is close to "star" 51, the orbital velocity will be high, and when it is far from "star" 51 the orbital velocity will be low. The high-velocity portion 52 of orbit 50 represents conditions where the range of prices during the longer interval exceeds the range during the shorter interval by more than would be expected based on a "square root of time" relationship, while the low-velocity portion 53 of orbit 50 represents conditions where the range of prices during the longer interval exceeds the range during the shorter interval by less than would be expected based on a "square root of time" relationship. The line 54 represents the points where the "square root of time" relationship is met exactly as one moves from region 52 to region 53 or vice-versa. To a gross approximation, if only one point were to be measured—i.e., only one comparison between a shorter interval and a longer interval was made, region 52 could be considered a price trend region, while region 53 could be considered a price congestion region. However, few useful predictions could be made based on one point.

Somewhat better predictions could be made based on two points. If two consecutive points are taken (i.e., two comparisons between respective long and short intervals), one can place current conditions in a particular quadrant of orbit 50. Thus, if two points are measured, both exceed the "square root of time" expectation, and the second is higher than the first, then the measured phenomenon—whether a stock market or some other phenomenon including a natural phenomenon—is in quadrant I (assuming a clockwise orbit), meaning that it is in a trend condition and the trend is accelerating. If two points are measured, both exceed the "square root of time" expectation, and the second is lower than the first, then the measured phenomenon is in quadrant II (assuming a clockwise orbit), meaning that it is in a trend condition but the trend is decelerating.

If two points are measured, both are less than the "square root of time" expectation, and the second is lower than the first, then the measured phenomenon is in quadrant III (assuming a clockwise orbit), meaning that it is in a congestion condition and decelerating into deeper congestion. If two points are measured, both are less than the "square root of time" expectation, and the second is higher than the first, then the measured phenomenon is in quadrant IV (assuming a clockwise orbit), meaning that it is in a congestion condition but is accelerating out of congestion toward a trend.

Finally, one could be in a situation spanning two quadrants. If two points are measured, the first exceeds the "square root of time" expectation, and the second is less than the "square root of time" expectation, then the measured phenomenon has just crossed from a trend condition into a congestion condition. Similarly, if two points are measured, the first is less than the "square root of time" expectation, and the second is exceeds the "square root of time" expectation, then the measured phenomenon has just crossed from a congestion condition into a trend condition.

The predictions that can be made using two points are qualitative—e.g., "we are moving out of congestion toward a trend." This is nevertheless useful. For example, if the measured phenomenon is stock price, and the determination is in quadrant IV, it may be a preferable time to buy (or sell), because while the price is about to break out into a trend, it is still congested and therefore there may be willing sellers (or buyers) who do not yet realize that the price will soon turn around.

One can determine the direction of the predicted trend based on the direction of movement of the actual price data at the time of transition from quadrant III to quadrant IV. That is the point where the congestion begins to decelerate. If at that point prices are moving up, the only way for the congestion to be decelerating is for the speed of price increase to slow until prices start to fall, meaning the coming trend will be a downward trend. If instead at that point prices are moving down, the only way for the congestion to be decelerating is for the speed of price decrease to slow until prices start to rise, meaning the coming trend will be an upward trend.

While qualitative predictions can be made, no quantitative prediction can be made, using two points, of how long it will take, for example, to break out of congestion. Such a prediction, however, may be made using three points, equally spaced in time. Actually, each point represents two time periods—a shorter interval and longer interval, as discussed above, but the emphasis here is that the time between the second and third measurement points should be the same as the time between the first and second measurement points. Because equal areas along ellipse 50 must be spanned in equal times, the area spanned between the second and third points must equal the area spanned between the first and second points. Moreover, one can then extrapolate and predict where one will be after one or more additional equal time intervals, by determining how far along the ellipse the measurement point must move during each time interval to sweep out the same area as was swept out between the first and second points and between the second and third points. Similarly, if one knows the time interval required to sweep a specific area, one can extrapolate and predict how long it will take to reach a specific point on the ellipse based on the total area to be swept to reach that point.

For any three orbital velocity points calculated according to the invention and evenly spaced in time, there will be only one elliptical eccentricity to which such orbital velocities can be fit so as to sweep equal areas in equal time. That ellipse can be found using tables of elliptical motion such as are commonly used by astronomers, and which may be found, e.g., in Bauschinger, J., et al., *Tafeln zur theoretischen Astronomie,* 2d ed. (Leipzig, 1934).

In the discussion so far, one set of measurements has been discussed, based on a particular duration—e.g., one-minute/four-minute measurements, or one-hour/four-hour measurements, or one-day/four-day measurements, etc. However, additional information could be gleaned by taking multiple sets of measurements. Thus, one could, at every minute, take a one-minute/four-minute measurement, and a one-hour/four-hour measurement, and a one-day/four-day measurement, etc., thereby looking at long- and short-term patterns.

Figure 6:
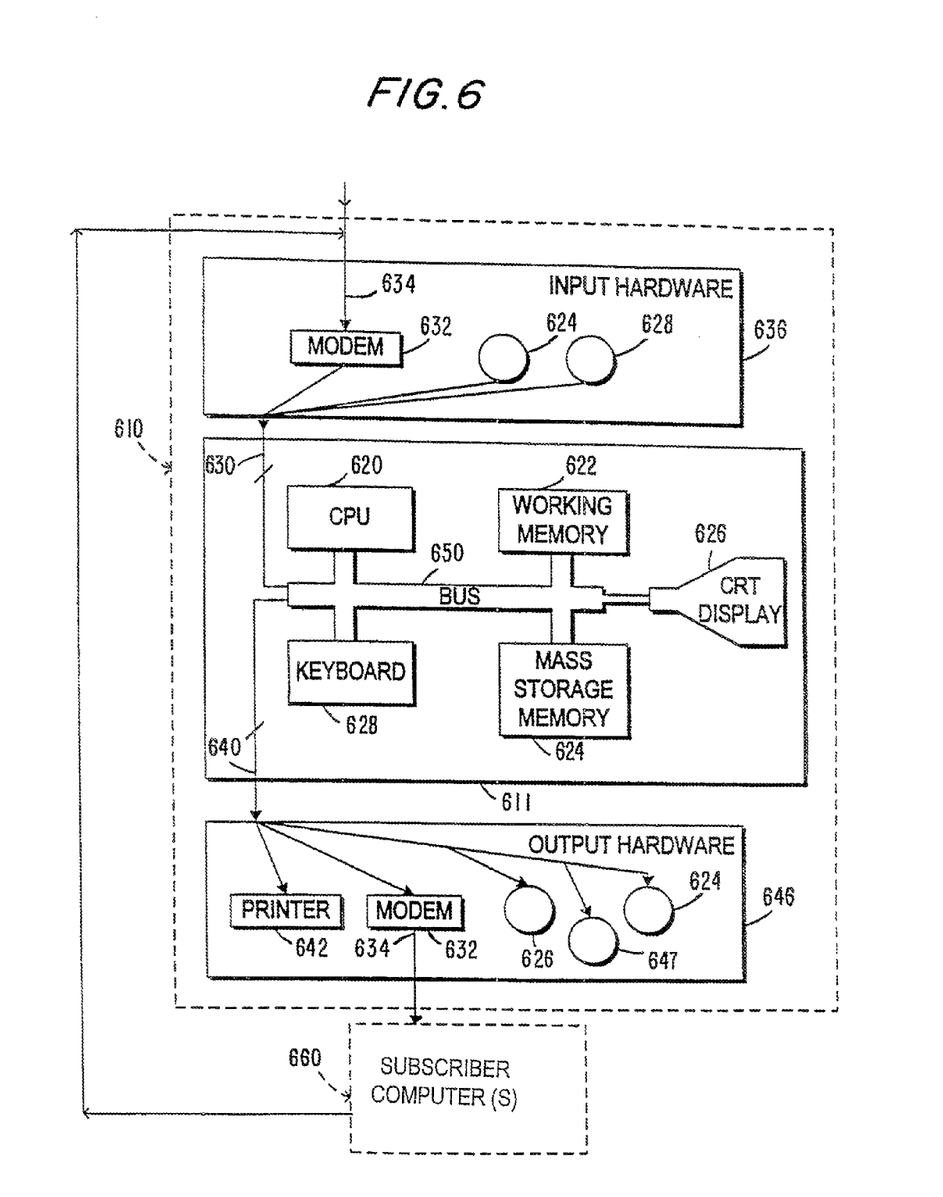
FIG. 6 is a schematic block diagram of an exemplary hardware system with which the invention can be used.

Exemplary computer hardware apparatus 610 with which the present invention may be implemented is shown in FIG. 6. In FIG. 6, which shows a first preferred embodiment of apparatus according to the invention, system 610 includes a computer 611 comprising a central processing unit ("CPU") 620, a working memory 622 which may be, e.g., RAM (random-access memory) or "core" memory, mass storage memory 624 (such as one or more disk drives or CD-ROM drives), one or more cathode-ray tube ("CRT") display terminals 626, one or more keyboards 628, one or more input lines 630, and one or more output lines 640, all of which are interconnected by a conventional bidirectional system bus 650.

Input hardware 636, coupled to computer 611 by input lines 630, may be implemented in a variety of ways. Modem or modems 632, which also may be routers or other computer-to-computer communications devices, connected by a telephone line or dedicated data line (such as a T1 or T3 line) 634 can be used to allow the system to obtain real-time (or near-real-time) data, such a stock price data, from a source such as a direct feed from one of the recognized stock exchanges, or a feed from a business data service. Modems/routers 632 also may be used to allow access through the Internet or other public access network. Alternatively or additionally, the input hardware 630 may comprise CD-ROM drives or disk drives 624, particularly for input of historical data (in case a user wants to plot data over long periods such as years. In conjunction with display terminal 626, keyboard 628 may also be used as an input device, particularly to select the time periods to be plotted.

Output hardware 646, coupled to computer 611 by output lines 640, may similarly be implemented by conventional devices. By way of example, output hardware 646 may include CRT display terminal 626 for displaying the values of the ratios for the selected periods, or the graphical representation of those values on an ellipse if desired. Output hardware 646 might also include a printer or other printing device 642, so that hard copy output may be produced, or a disk drive 624, to store system output for later use. Finally, output hardware 646 includes the necessary hardware to make the output data available to subscribers over modems or routers 632.

As stated above, implementation of the present invention may be computationally intensive. For example, in a preferred embodiment, every minute the system must calculate the ratio of the range over the previous four minutes to the range over first of those four minutes, for every index and individual stock or other instrument being tracked. This is in addition to similar calculations done hourly for the preceding four hour period, daily for the preceding four day period, etc. This can be achieved in a preferred embodiment by having subscribers allow their computers 660 to be used, while they are connected to the system, to perform some of the calculations during processor idle time. This could be required by the subscription agreement, or it could be optional, with a discount offered to those who allow their computers to be used.

Such a distributed computing system can be implemented using the FRONTIER™ distributed computing platform available from Parabon Computation, Inc., of Fairfax, Va., with subscriber computers 660 running the PIONEER™90 client software, also from Parabon Computation, Inc. The PIONEER™ software functions as, or in place of, a "screen saver" program, processing data during periods when the system would otherwise be idle, and returning the results to the FRONTIER™ platform via the Internet or other data network to which computers 660 are attached.

In operation, CPU 620 coordinates the use of the various input and output devices 636, 646, coordinates data accesses from mass storage 624 and accesses to and from working memory 622, and determines the sequence of data processing steps. CPU 620 preferably also directs the parcelling out of data to subscribers' computers 660 for processing, and the collection and aggregation of processed data returned by subscriber computers 660.

Whether performed solely on computer 611 (or on a plurality of computers co-located with computer 611), or whether performed on a distributed basis such as on subscriber computers 660 as just described, each computer would, for a given measurement point, examine all recorded values between four (for example) time units prior to the measurement point and three time units prior to the measurement point of the price or index to be measured, and compute the difference between the maximum and minimum values during that interval. The computer would then multiply that result by two to obtain the expected range between the longer time interval between four time units prior to the measurement point and the measurement point. The computer would then examine all recorded values of the price or index to be measured during that longer interval, and again compute the difference between the maximum and minimum values during that interval to obtain the actual range. The actual range would then be compared to the expected range as described above.

Alternatively, computer 611 or each individual subscriber computer (not shown) could be equipped with a Brownian motion standard chip as described above, which would allow a direct comparison, for any time interval, between the actual and expect range of change of the price or index to be measured. For example, the random number generator provided in the Intel® 810 chipset, from Intel Corporation, of Santa Clara, Calif., generates a non-deterministic "random" stream of numbers from thermal noise from a resistor. This stream of numbers, based on thermal noise, is in fact a Brownian motion standard.

Figure 7:
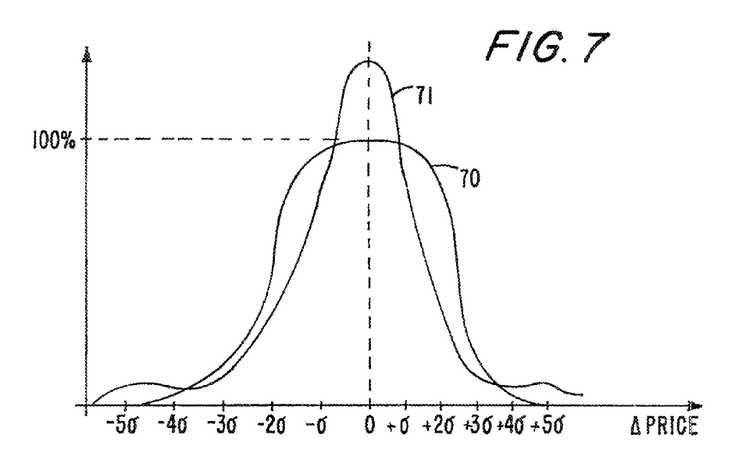
FIG. 7 is a graph comparing the ranging of stock prices to a Gaussian bell curve produced by a Brownian motion standard.

The results of the data comparisons according to the invention may be displayed to users or subscribers in a number of ways. For example, as shown in FIG. 7, and particularly if the Brownian motion standard is used, the results may be displayed by graphing the expected Gaussian bell curve 70 representing a normal distribution, and then superimposing a curve 71 representing actual conditions. These curves would be for a specified time interval, such as the four-minute interval if one-minute/four-minute measurements are used, or the four-hour interval if one-hour/four-hour measurements are used. The curves would show the relative number of occurrences (each representing one transaction) of normalized price changes about a mean value, which can be expected to be zero. Thus, preferably, the peaks of curves 70 and 71 would represent the normalized number of occurrences, or expected occurrences, of price changes of zero magnitude, and the abscissa preferably would be labelled with the number of standard deviations above or below zero. The ordinate preferably would be labelled in percentages, with 100% representing the peak of Gaussian curve 70.

If the graph in FIG. 7 represents data captured during a sufficiently long interval—e.g., four hours, the number of data points (transactions) should be sufficient to generate curve 71 with confidence. However, if there are too few data points (e.g., the interval is short, such as four minutes, and there are too few transactions), then well-known conventional "bootstrapping" techniques can be used generate a curve 71 from the available data. In such a case, there would be some uncertainty in the curve. This could be displayed to the user by, e.g., displaying a band (not shown) of a different color about curve 71, with the width of the band representing the margin of error of curve 71.

Figure 8:
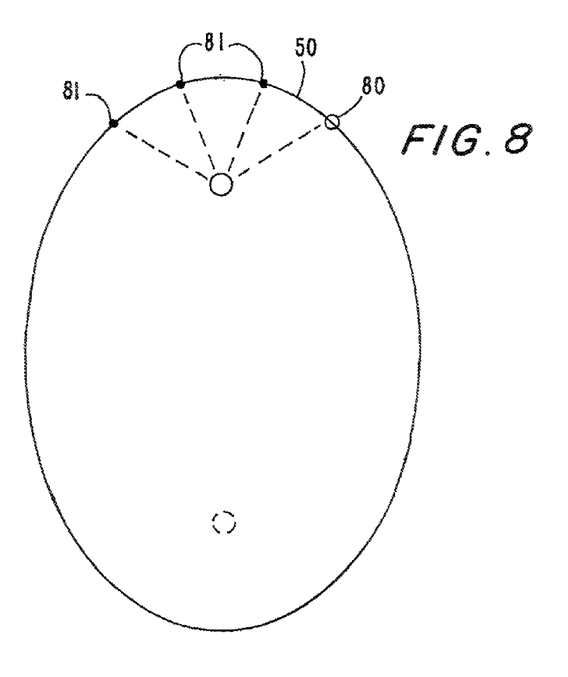
FIG. 8 is a plot showing ranging of prices along the orbit plotted in FIG. 5.

Alternatively, as shown in FIG. 8, the ellipse 50 described above can be displayed, with a highlighted point 80 representing the present, and points 81 representing past measurements. In addition, the eccentricity of the ellipse would reveal the relative size of the congealed group of buyers/sellers ("dissenters") as compared to the Brownian core of market participants ("majority"). For example, if the ellipse is close to circular, then the number of dissenters is small and any apparent trends may be statistically insignificant, while if the ellipse is highly elongated, the number of dissenters is very large and it may be too late to join the trend (most of the gains may have already occurred).

Additional information (not shown) could be indicated on the display of FIG. 8. For example, indicia identifying halves of ellipse 50 representing congestion and trend situations, or even quadrants, as described above, representing accelerating trend, decelerating tend, decelerating (deepening) congestion, and accelerating (lessening) congestion, could be displayed to assist users in interpreting the display.

As in the case of the display of FIG. 7, the display of FIG. 8, the data used to create ellipse 50 may be insufficient to give full confidence in the result. For example, if each point 81 is based on data taken during a short time period, then the location of each point may have a sufficient margin of error to introduce some uncertainty into the fit of points 81 onto an ellipse. In such a case, any uncertainty in the elliptical path could be represented by a band of a different color as described in connection with FIG. 7.

Figure 9:
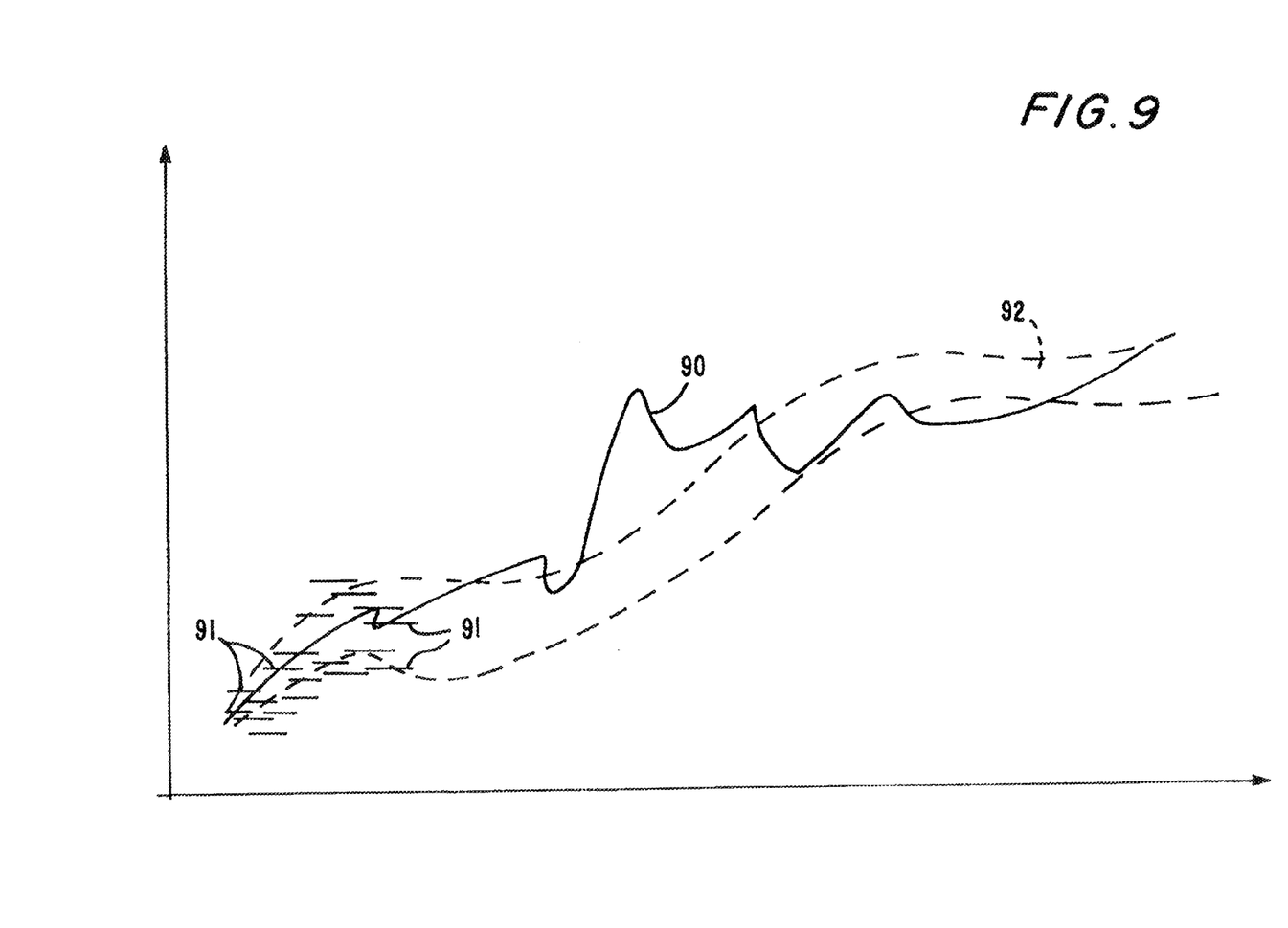
FIG. 9 is a representation of a preferred output display produced by the invention.

Finally, in a particularly preferred display shown in FIG. 9, a simple line graph 90 showing the value of the measured price or index (e.g., the Dow Jones Industrial Average ("DJIA")) as a function of time can be provided. Superimposed on this line graph 90, perhaps in a different color, can be a pair of bars 91 representing the expected range of the depicted price or index over various measured time intervals. Thus, if the graph is a daily graph of the DJIA, the measured time intervals might be overlapping four-day intervals, each beginning one day apart. The effect would be a band 92 representing the expected range of the DJIA superimposed on the graph 90 of the DJIA itself. Note that in FIG. 9, the bars 91 forming band 92 are shown only for the first few time intervals on the graph to avoid cluttering the graph.

As long as the DJIA value remains inside band 92, things are as expected. However, if the value moves outside band, it may signal a trend which is upward if the value is above the band or downward if the value is below the band.

Although not shown, a display integrating two or more of the displays of FIGS. 7, 8 and 9 could be provided.

Thus it is seen that a model of market activity that explains the non-normal distribution of such activity, and a technique for market prediction based on that model, has been provided. One skilled in the art will appreciate that the present invention can be practiced by other than the described embodiments, which are presented for purposes of illustration and not of limitation, and the present invention is limited only by the claims which follow.

What is claimed is:

1. A method for analyzing price data, representing price in a financial system that varies over time, said method comprising:

beginning at a first initial moment, acquiring said price data at a processor during an initial first duration and determining using said processor an initial first range of said price data between a minimum value during said initial first duration and a maximum value during said initial first duration;

beginning at said first initial moment, acquiring said price data at said processor during an initial second duration of which said initial first duration is a multiple and determining using said processor an initial second range of said price data between a minimum value during said initial second duration and a maximum value during said initial second duration;

forming, using said processor, a ratio of said initial first range of said price data during said initial first duration to said initial second range of said price data during said initial second duration;

when said ratio exceeds a square root of said multiple, concluding, using said processor, that said system is varying in a trend; and when said ratio is less than said square root of multiple, concluding, using said processor, that said system is congesting.

2. The method of claim 1 further comprising, after said acquiring and before said comparing, applying bootstrapping techniques to said price data.

3. The method of claim 1 further comprising:

beginning at a subsequent initial moment, acquiring said price data at said processor during a subsequent first duration and determining, using said processor, a subsequent first range of said price data between a minimum value during said subsequent first duration and a maximum value during said subsequent first duration;

beginning at said subsequent initial moment, acquiring said price data at said processor during a subsequent second duration of which said subsequent first duration is said multiple and determining, using said processor, a subsequent second range of said price data between a minimum value during said subsequent second duration and a maximum value during said subsequent second duration;

computing, using said processor, a ratio of said subsequent first range to said subsequent second range; and comparing, using said processor, said ratio of said subsequent first range to said subsequent second range to said multiple, and determining from said comparison of said ratio to said multiple, using said processor, how said system is varying.

4. The method of claim 3 further comprising repeating, at respective multiple additional subsequent initial moments:

acquiring said price data at said processor during each respective subsequent first duration;

acquiring said price data at said processor during each respective subsequent second duration;

computing, using said processor, a respective ratio of each respective subsequent first range to each respective subsequent second range;

comparing, using said processor, each respective ratio of each respective subsequent first range to each respective subsequent second range to said multiple to obtain a respective comparison; and determining from said respective comparisons, using said processor, how said system is varying.

5. The method of claim 4 wherein, for each of said initial moments:

said comparing said respective ratio to said multiple, and said determining, comprise:

when said respective ratio exceeds a square root of said multiple, concluding that said system is varying in a trend, and when said respective ratio is less than said square root, concluding that said system is congesting.

6. The method of claim 5 further comprising comparing, using said processor, respective ones of said ratio for two consecutive ones of said initial moments and:

when each of said respective ones of said ratio exceeds a square root of said multiple and a subsequent respective one of said ratio exceeds a prior respective one of said ratio, concluding, using said processor, that said system is varying in a trend and said trend is accelerating;

when each of said respective ones of said ratio exceeds said square root and a prior respective one of said ratio exceeds a subsequent respective one of said ratio, concluding, using said processor, that said system is varying in a trend and said trend is decelerating;

when each of said respective ones of said ratio is less than said square root and a prior respective one of said ratio exceeds a subsequent respective one of said ratio, concluding, using said processor, that said system is congesting and said congestion is accelerating;

when each of said respective ones of said ratio is less than said square root and a subsequent respective one of said ratio exceeds a prior respective one of said ratio, concluding, using said processor, that said system is congesting and said congestion is decelerating;

when a prior respective one of said ratio is less than said square root and a subsequent respective one of said ratio exceeds said square root, concluding, using said processor, that said system has moved from congestion into a trend; and when a prior respective one of said ratio exceeds said square root and a subsequent respective one of said ratio is less than said square root, concluding, using said processor, that said system has moved from a trend into congestion.

7. The method of claim 6 further comprising:

when said system is in a current condition of congestion or trend, comparing, using said processor, respective ones of said ratio for three consecutive respective ones of said initial moments separated by equal time intervals; and deriving, using said processor, from said comparison of said respective ones of said ratio for three consecutive respective ones of said initial moments, a prediction of when said system will move from said current condition of congestion or trend to another condition of congestion or trend.

8. The method of claim 7 further comprising displaying said prediction in the form of a closed curve with price data points from said three consecutive respective ones of said initial moments identified on said closed curve.

9. The method of claim 1 further comprising displaying said initial first range of said price data and said expected range of said price data.

10. The method of claim 9 wherein said displaying comprises displaying a line graph.

11. The method of claim 9 wherein said displaying comprises displaying an orbital plot.

12. The method of claim 4 further comprising repeating, at multiple additional sets of multiple initial moments:

said acquiring said price data at said processor during each respective subsequent first duration;

said computing, using said processor, a respective actual range of said price data between a minimum value during each respective subsequent first duration and a maximum value during each respective subsequent first duration;

said computing, using said processor, a respective ratio of each respective subsequent first range to each respective subsequent second range;

said comparing, using said processor, each respective ratio of each respective subsequent first range to each respective subsequent second range to said multiple to obtain a respective comparison; and said determining from said respective comparisons, using said processor, how said system is varying; wherein:

said duration differs for each said set.

13. Apparatus for analyzing price data, representing price in a financial system that varies over time, said apparatus comprising:

means for, beginning at a first initial moment, acquiring said price data during an initial first duration and determining an initial first range of said price data between a minimum value during said initial first duration and a maximum value during said initial first duration;

means for, beginning at said first initial moment, acquiring said price data during an initial second duration of which said initial first duration is a multiple and determining an initial second range of said price data between a minimum value during said initial second duration and a maximum value during said initial second duration;

means for forming a ratio of said initial first range of said price data during said initial first duration to said initial second range of said price data during said initial second duration; and means for concluding:

when said ratio exceeds a square root of said multiple, that said system is varying in a trend; and when said ratio is less than said square root of multiple, that said system is congesting.

14. The apparatus of claim 13 further comprising:
means for, beginning at a subsequent initial moment, acquiring said price data during a subsequent first duration and determining a subsequent first range of said price data between a minimum value during said subsequent first duration and a maximum value during said subsequent first duration;
means for, beginning at said subsequent initial moment, acquiring said price data during a subsequent second duration of which said subsequent first duration is said multiple and determining a subsequent second range of said price data between a minimum value during said subsequent second duration and a maximum value during said subsequent second duration;
means for computing a ratio of said subsequent first range to said subsequent second range; and
means for comparing said ratio of said subsequent first range to said subsequent second range to said multiple, and determining from said comparison of said ratio to said multiple how said system is varying.

15. The apparatus of claim 13 further comprising means for displaying said ratio of said initial first range of said price data to said initial second range of said price data and said multiple.

16. The apparatus of claim 15 wherein said displaying means displays a line graph.

17. The apparatus of claim 15 wherein said displaying means displays a orbital plot.

18. Apparatus for analyzing price data, representing price in a financial system that varies over time, said apparatus comprising:
a data feed that, beginning at a first initial moment, acquires said price data during an initial first duration, and beginning at said first initial moment, acquires said price data during an initial second duration of which said initial first duration is a multiple; and
a processor programmed with instructions to determine an initial first range of said price data between a minimum value during said initial first duration and a maximum value during said initial first duration and instructions to determine an initial second range of said price data between a minimum value during said initial second duration and a maximum value during said initial second duration; wherein said instructions comprise:
instructions to form ratio of said initial first range to said initial second range; and
instructions to conclude:
that said system is varying in a trend when said ratio exceeds a square root of said multiple, and
that said system is congesting when said ratio is less than said square root of said multiple.

19. The apparatus of claim 18 wherein said processor applies bootstrapping techniques to said acquired price data.

20. The apparatus of claim 18 wherein:
said data feed, beginning at a subsequent initial moment, acquires said price data during a subsequent 5 first duration;
said instructions comprise instructions to determine a subsequent first range of said price data between a minimum value during said subsequent first duration and a maximum value during said subsequent first duration;
said data feed, beginning at said subsequent initial moment, acquires said price data during a subsequent second duration of which said subsequent first duration is said multiple;
said instructions comprise instructions to determine a subsequent second range of said price data between a minimum value during said subsequent second duration and a maximum value during said subsequent second duration; and
said instructions comprise instructions to compute a ratio of said subsequent first range to said subsequent second range, to compare said ratio to said multiple, and to determine from said comparison how said system is varying.

21. The apparatus of claim 18 further comprising a display that displays said ratio of said initial first range of said price data to said initial second range of said price data and said multiple.

22. The apparatus of claim 21 wherein said display displays a line graph.

23. The apparatus of claim 21 wherein said display displays a orbital plot.

24. A method for analyzing price data, representing price in a financial system that varies over time, said method comprising:
beginning at an initial moment, acquiring said price data during a duration of a first length of time and determining a first range of said price data between a minimum value during said duration of said first length of time and a maximum value during said duration of said first length of time;
determining a second range of said price data during a duration of a second length of time beginning at said initial moment, said duration of said second length of time being a multiple of said duration of said first length of time, said second range being a product of said first range and a square root of said multiple; and
monitoring an instantaneous value of said price data during said duration of said second length of time and determining that said system is varying in a trend when said instantaneous value is outside said second range.

25. Apparatus for analyzing price data, representing price in a financial system that varies over time, said apparatus comprising:
means for, beginning at an initial moment, acquiring said price data during a duration of a first length of time and determining a first range of said data between a minimum value during said duration of said first length of time and a maximum value during said duration of said first length of time;
means for determining a second range of said price data during a duration of a second length of time beginning at said initial moment, said duration of said second length of time being a multiple of said duration of said first length of time, said second range being a product of said first range and a square root of said multiple; and
means for monitoring an instantaneous value of said price data during said duration of said second length of time and determining that said system is varying in a trend when said instantaneous value is outside said second range.

26. Apparatus for analyzing price data, representing price in a financial system that varies over time, said apparatus comprising:
a data feed for, beginning at an initial moment, acquiring said price data during a duration of a first length of time and monitoring an instantaneous value of said price data during a duration of a second length of time beginning at said initial moment; and
a processor programmed with instructions to:

determine a first range of said price data between a minimum value during said duration of said first length of time and a maximum value during said duration of said first length of time, determine a second range of said price data during said duration of said second length of time beginning at said initial moment, said duration of said second length of time being a multiple of said duration of said first length of time, said second range being a product of said first range and a square root of said multiple, and determine that said system is varying in a trend when said instantaneous value is outside said second range.

* * * * *